United States Patent
Daguin et al.

(10) Patent No.: US 9,810,231 B2
(45) Date of Patent: Nov. 7, 2017

(54) TURBOCHARGER WITH JOURNAL BEARING

(71) Applicant: HONEYWELL INTERNATIONAL INC., Morristown, NJ (US)

(72) Inventors: Frederic Daguin, Epinal (FR); Joel Castan, Chantraine (FR); Nicolas Vazeille, Bainville aux miroirs (FR); Dominique Armand, Vosges (FR); Steven Liu, Shanghai (CN); Yong Jun Chen, Shanghai (CN); Shinichi Adachi, Saitama (JP)

(73) Assignee: Honeywell International Inc., Morris Plains, NJ (US)

( * ) Notice: Subject to any disclaimer, the term of this patent is extended or adjusted under 35 U.S.C. 154(b) by 409 days.

(21) Appl. No.: 14/394,759

(22) PCT Filed: May 13, 2013

(86) PCT No.: PCT/US2013/040758
§ 371 (c)(1),
(2) Date: Oct. 16, 2014

(87) PCT Pub. No.: WO2013/173220
PCT Pub. Date: Nov. 21, 2013

(65) Prior Publication Data
US 2015/0093233 A1    Apr. 2, 2015

Related U.S. Application Data

(60) Provisional application No. 61/647,038, filed on May 15, 2012.

(51) Int. Cl.
*F04D 29/056* (2006.01)
*F01D 25/16* (2006.01)
(Continued)

(52) U.S. Cl.
CPC ......... *F04D 29/056* (2013.01); *F01D 25/162* (2013.01); *F01D 25/166* (2013.01);
(Continued)

(58) Field of Classification Search
CPC .... F04D 29/056; F01D 25/162; F01D 25/166; F02B 37/00; F16C 33/1065; F16C 33/1085; F16C 35/02
See application file for complete search history.

(56) References Cited

U.S. PATENT DOCUMENTS

| 3,056,634 A | 10/1962 | Wollenweber et al. |
| 4,655,043 A * | 4/1987 | McInerney ........... F01D 25/168 60/602 |

(Continued)

FOREIGN PATENT DOCUMENTS

| EP | 2290198 A2 | 3/2011 |
| EP | 2500544 A1 | 9/2012 |

(Continued)

OTHER PUBLICATIONS

EP Application No. 13 79 0839—Supplementary European Search Report—dated Jan. 14, 2016 (6 pages).
PCT/US2013/040758 PCT ISR and Written Opinion (9 pages).

*Primary Examiner* — Richard Edgar
(74) *Attorney, Agent, or Firm* — Brian J. Pangrle

(57) ABSTRACT

A turbocharger assembly can include a housing with a through bore and an axial face disposed in the through bore; a locating plate with a keyed opening attached to the housing; and a journal bearing disposed in the through bore where the journal bearing includes a keyed compressor end and an enlarged outer portion defined between two axial faces by an outer diameter and an axial length where the axial face disposed in the through bore of the housing, the locating plate, and the two axial faces of the journal bearing axially locate the journal bearing in the through bore and (Continued)

where the keyed opening of the locating plate and the keyed compressor end of the journal bearing azimuthally locate the journal bearing in the through bore. Various other examples of devices, assemblies, systems, methods, etc., are also disclosed.

18 Claims, 14 Drawing Sheets

(51) Int. Cl.
    *F16C 35/02*     (2006.01)
    *F16C 33/10*     (2006.01)
    *F02B 37/00*     (2006.01)
    *F02B 37/16*     (2006.01)
    *F16C 17/10*     (2006.01)
    *F16C 27/04*     (2006.01)

(52) U.S. Cl.
    CPC .......... *F02B 37/00* (2013.01); *F16C 33/1065* (2013.01); *F16C 33/1085* (2013.01); *F16C 35/02* (2013.01); *F02B 37/16* (2013.01); *F05D 2220/40* (2013.01); *F05D 2260/36* (2013.01); *F16C 17/10* (2013.01); *F16C 27/045* (2013.01); *F16C 2226/50* (2013.01); *F16C 2360/24* (2013.01)

(56) References Cited

U.S. PATENT DOCUMENTS

| | | |
|---|---|---|
| 4,997,290 A | 3/1991 | Aida |
| 6,126,414 A | 10/2000 | Koike |
| 6,364,634 B1 | 4/2002 | Svihla et al. |
| 8,857,180 B2 * | 10/2014 | Begin .................... F01D 25/166 |
| | | 123/41.31 |
| 9,528,389 B2 * | 12/2016 | Koerner .................. F01D 25/16 |
| 2005/0210875 A1 | 9/2005 | Larue et al. |
| 2007/0172365 A1 | 7/2007 | Shimizu et al. |
| 2009/0081040 A1 | 3/2009 | Ueno et al. |
| 2011/0052429 A1 | 3/2011 | Marsal et al. |
| 2012/0045326 A1 * | 2/2012 | House ..................... F01D 25/16 |
| | | 415/229 |
| 2014/0369820 A1 * | 12/2014 | Koch .................... F01D 25/166 |
| | | 415/170.1 |

FOREIGN PATENT DOCUMENTS

| | | |
|---|---|---|
| EP | 2573362 A2 | 3/2013 |
| JP | 2002039191 A | 2/2002 |
| JP | 2005163641 A | 6/2005 |
| JP | 2010223249 A | 10/2010 |
| WO | 2010129404 A2 | 11/2010 |
| WO | 2010129407 A2 | 11/2010 |
| WO | 2011058627 A1 | 5/2011 |

* cited by examiner

Process 300

302 Machining fixture wear

304 Locating pin position error

306 Bias of J - Bearing position

308 Reduce J - Bearing OD clearance

310 Increase sub - synchronous noise $$\Delta L/L = \alpha \Delta T \quad \Delta L = L\alpha \Delta T$$

TURBOCHARGER WITH JOURNAL BEARING

RELATED APPLICATION

This application claims the benefit of a U.S. Provisional Patent Application having Ser. No. 61/647,038, filed 15 May 2012, entitled "Turbocharger with Journal Bearing", which is incorporated herein by reference.

TECHNICAL FIELD

Subject matter disclosed herein relates generally to turbochargers for internal combustion engines.

BACKGROUND

Turbochargers can include various types of bearings to support a shaft and wheel assembly (SWA). As an example, a turbocharger may include a rolling element bearing that includes an inner race fit to a shaft where the inner race is rotatably supported by rolling elements set within an outer race. In such an example, a mechanism may be provided to avoid or limit rotation of the outer race while optionally allowing for lubricant film formation between the outer race and a bore of a turbocharger bearing housing (e.g., a center housing disposed between a turbine housing and a compressor housing).

As another example, a turbocharger may include a journal bearing with inner journal surfaces to support a shaft via formation of a lubricant film between the shaft and the inner journal surfaces. In such an example, a mechanism may be provided to avoid or limit rotation of the journal bearing while optionally allowing for lubricant film formation between the journal bearing and a bore of a turbocharger housing (e.g., a center housing disposed between a turbine housing and a compressor housing). Thus, in comparison to a rolling element bearing, a journal bearing may include inner and outer lubricant films.

A journal bearing may be set within a bore of a housing as a fully-floating or semi-floating journal bearing. A fully-floating journal bearing can rotate within the bore a full 360 degrees, for example, parasitically responsive to rotation of a shaft supported by the journal bearing. A semi-floating journal bearing is located azimuthally to avoid or limit rotation. For example, a semi-floating journal bearing may include an aperture configured for receipt of a locating pin where a clearance between a perimeter of the aperture and a perimeter of the locating pin limits rotation of the semi-floating journal bearing with respect to a bore of a housing. A locating pin may also axially locate a semi-floating journal bearing within a bore of a housing. However, a locating pin and aperture arrangement can allow for some amount of radial movement of the semi-floating journal bearing within a bore to provide for radial "floating". Radial floating allows a lubricant film or lubricant films disposed between an outer surface or outer surfaces of a journal bearing and an inner surface or inner surfaces of a housing (e.g., that define a bore) to absorb or damp energy. For example, such a lubricant film or films may damp vibrational energy.

Where a locating pin is employed to axially and azimuthally locate a journal bearing in a bore of a housing, the locating pin may be aligned with gravity such that the journal bearing and shaft and wheel assembly can settle to a bottom side of the bore. For a turbocharger lubricated by oil of an internal combustion engine, when the engine is started, pressurized oil can enter a bore and fill clearances between the bore and a journal bearing to thereby form lubricant films. Radially movement of a journal bearing within a bore in a direction aligned with gravity can help minimize friction and wear of a perimeter of an aperture in a journal bearing and a perimeter of a locating pin disposed at least partially therein.

As to axially locating a journal bearing via a locating pin disposed in an aperture of the journal bearing, a perimeter of the aperture and a perimeter of the locating pin are likely to experience axial thrust forces during turbocharger operation. Axial thrust forces may be directed in a direction from a turbine wheel to a compressor wheel or vice versa. A shaft and turbine wheel assembly supported by a journal bearing may include an axial face that abuts a turbine end of the journal bearing. For axial thrust forces in a direction from the turbine wheel to a compressor wheel, the axial face of the shaft and turbine wheel assembly may impact the journal bearing. In turn, such force can be transmitted to a locating pin disposed in an aperture of the journal bearing. Over time, the force may cause a perimeter of the aperture or a perimeter of the locating pin to wear, which may alter a clearance or clearances between the locating pin and the journal bearing. Wear may also occur between a locating pin and a socket in a housing that receives the locating pin. For example, a locating pin and socket may include matching threads that allow the locating pin to be screwed into the housing. Axial thrust forces and possibly other forces applied by a journal bearing to such a locating pin may cause the locating pin to become loose or displaced. Misalignment of the locating pin stemming from such wear can detrimentally impact performance of one or more lubricant films of a semi-floating journal bearing.

Referring again to thrust forces, as to rolling element bearings, such forces may be transferred from a shaft to an inner race to rolling elements and to an outer race. As a journal bearing does not retain a shaft in such a manner, a journal bearing can include so-called thrust pads on a compressor end, a turbine end or both. A thrust pad may be a feature that allows lubricant to flow, collect, etc., to minimize impact caused by another component being axially thrust toward an end of a journal bearing. Further, as to an axial face formed as by a shoulder between a shaft and a hub end of a turbine wheel, such a face may impact a turbine end of a semi-floating journal bearing with both axial and rotational forces. As to a rolling element bearing, again, as a shaft is fixed to an inner race of rolling elements disposed within an outer race, an axial face of a shaft and turbine wheel assembly is unlikely to impact an end of the rolling element bearing. For example, clearance between an axial face of a shaft and turbine wheel assembly may be fixed upon fixing the shaft to an inner race within a rolling element bearing.

Various technologies and techniques described herein are directed to journal bearings, housings, assemblies, etc., which may improve turbocharger performance, longevity, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
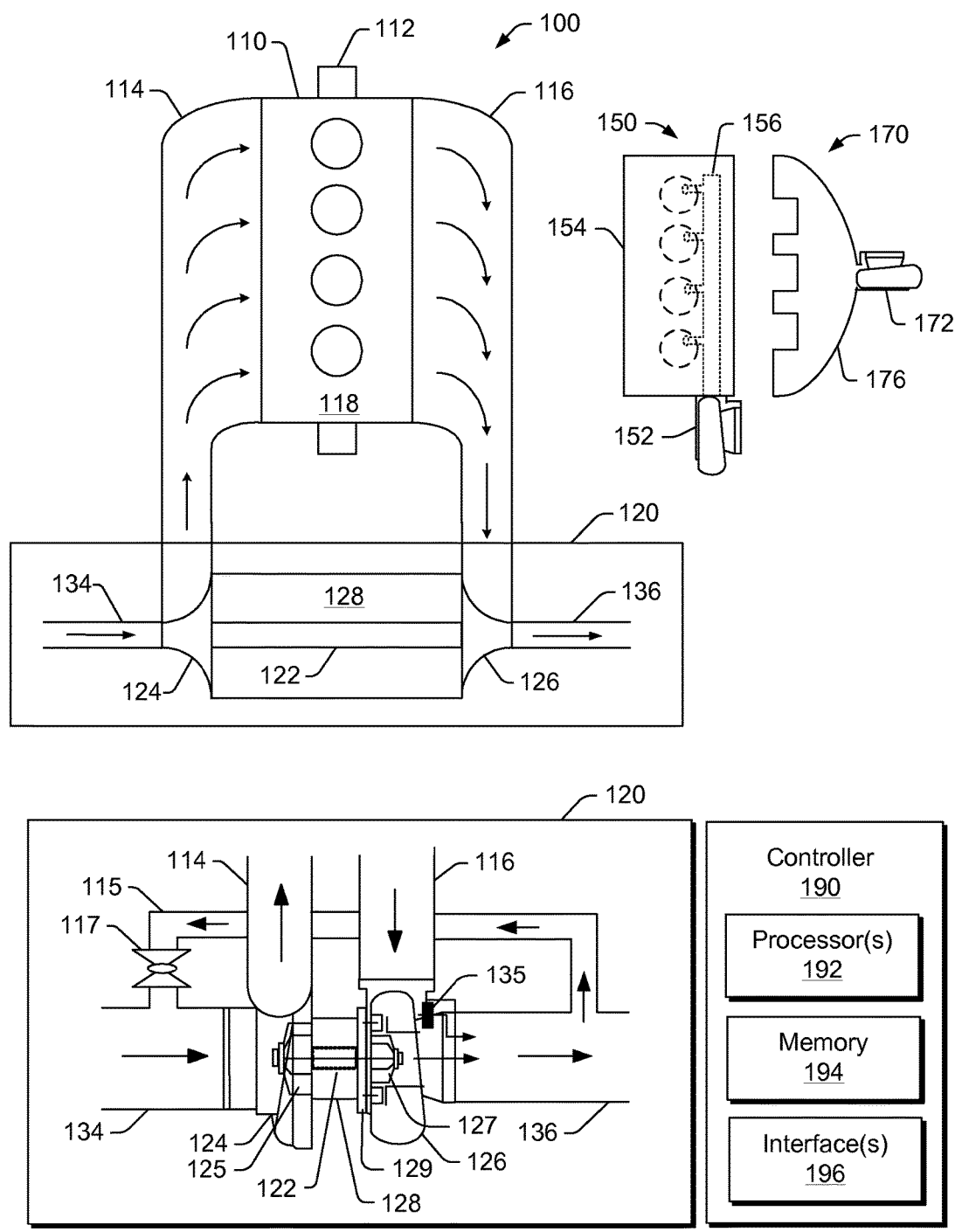
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system disposed in the housing 128 such that rotation of the turbine wheel 127 causes rotation of the compressor wheel 125.

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
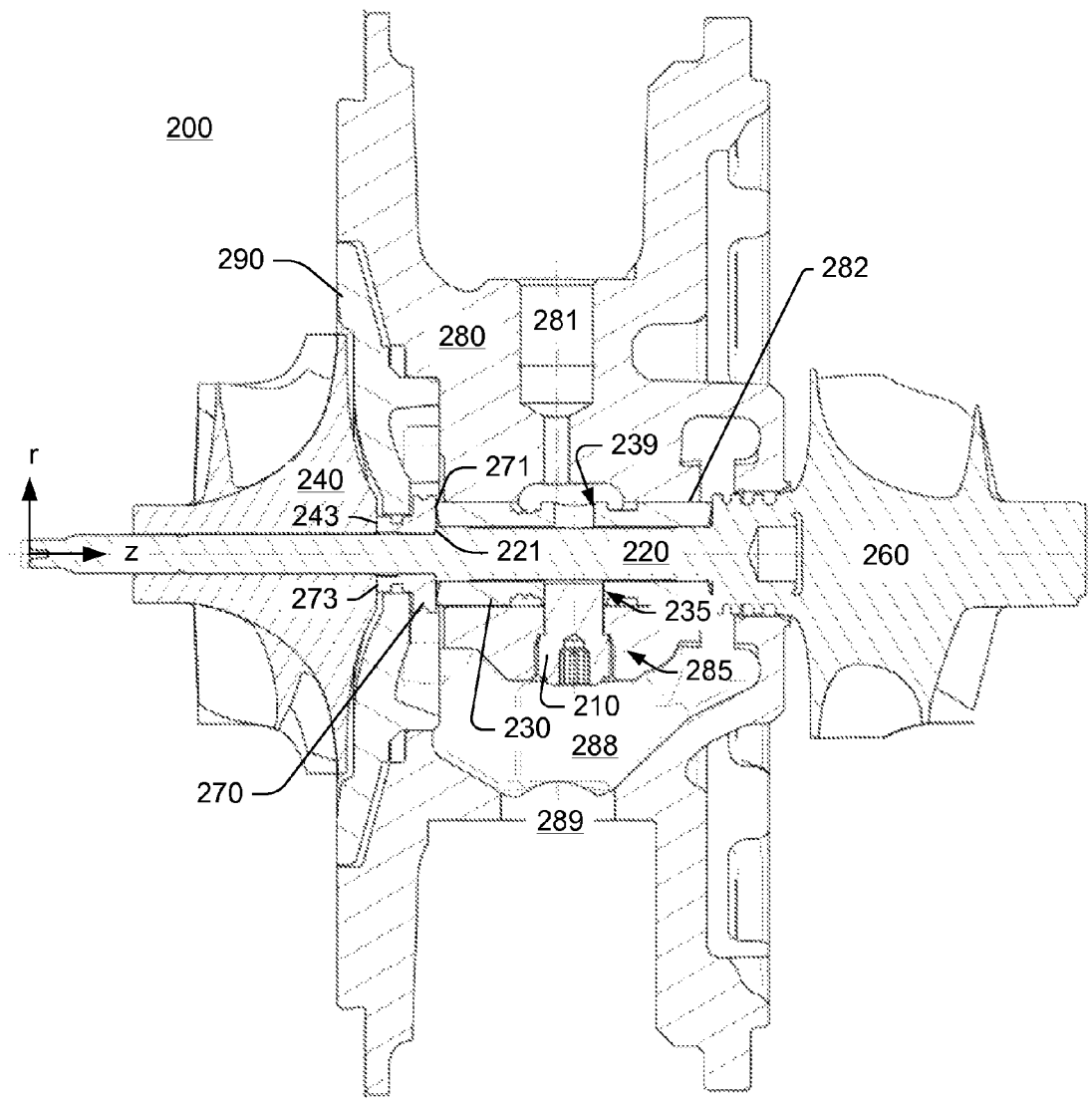
FIG. 2 is a cross-sectional view of an example of a turbocharger assembly.

FIG. 2 shows an example of a turbocharger assembly 200 that includes a shaft 220 supported by a journal bearing 230 disposed in a through bore 282 of a housing 280 between a compressor wheel 240 and a turbine wheel 260; noting that a thrust spacer 270 that includes a bearing side axial face 271 and a compressor side axial face 273 is shown as being positioned on the shaft 220 between the compressor wheel 240 and a shoulder of the shaft 220. As shown in FIG. 2, the shoulder is formed by a step in diameter of the shaft 220 from a smaller diameter to a larger diameter, forming an annular axial face 221. On one side, the axial face 271 of the thrust spacer 270 abuts the axial face 221 of the shaft 220 and, on the other side, the axial face 273 of the thrust space 270 abuts an annular axial face 243 of the compressor wheel 240.

The journal bearing 230 is located in the through bore 282 of the housing 280 via a locating pin 210. The locating pin 210 is screwed into a socket 285 of the housing 280 and received by an aperture 235 of the journal bearing 230. The locating pin 210 axially and azimuthally locates the journal bearing 230 in the bore of the housing 280. Opposite the aperture 235, the journal bearing 230 includes a lubricant opening 239 for flow of lubricant to inner journal surfaces of the journal bearing 230 that support the shaft 220. Lubricant may flow to the through bore 282 of the housing 280 via a lubricant inlet 281, through the lubricant opening 239 and to the inner journal surfaces to form lubricant films that lubricate the shaft 220 within the journal bearing 230. Lubricant may also flow to clearances between walls of the through bore 282 of the housing 280 and outer surfaces of the journal bearing 230. Lubricant may exit the housing 280 via a lower lubricant collection chamber 288 that includes a lubricant exit 289. As shown, the locating pin 210 may be accessible via the lubricant exit 289 (e.g., for installation and removal).

The example of FIG. 2 is shown with respect to a cylindrical coordinate system in a r,z-plane where the z-coordinate corresponds to a rotational axis for the shaft 220, for example, as defined by a center axis of the through bore 282 of the housing 280. Various features in FIG. 2 may be described, for example, with respect to r, z and/or azimuthal (θ) coordinates. In the example of FIG. 2, the shaft 220 may be part of a shaft and wheel assembly (SWA) that includes the turbine wheel 260. In such an example, the compressor wheel 240 may include a through bore (e.g., or a partial bore) to be fit onto the shaft of an SWA. As an example, a SWA may include one or more annular grooves that may optionally be used to seat one or more seal components, for example, to form lubricant seals between the housing 280 and the SWA. In such an example, the lubricant seals may help prevent lubricant migration to a turbine wheel space as well as entry of exhaust to a bearing space.

In the example of FIG. 2, a back plate 290 is shown as being disposed between the compressor wheel 240 and the housing 280, for example, as being received at least partially in a recess on a compressor side face of the housing 280. As shown, the back plate 290 includes an aperture through which an axial length of the thrust spacer 270 extends and the back plate 290 includes a bearing side axial face that faces an annular axial face of the thrust spacer 270. As an example, a seal component may be positioned along the axial length of the thrust spacer 270 to form a seal between the thrust spacer 270 and the back plate 270 (e.g., an O-ring or other component may be seated in an annular groove of the thrust spacer 270, the back plate 290, etc.). Such a seal component, as arranged with respect to the thrust spacer 270 and the back plate 290 may help prevent migration of lubricant to a compressor wheel space (e.g., to resist flow of lubricant into a compressor and being passed to a combustion chamber of an internal combustion engine).

Figure 3:
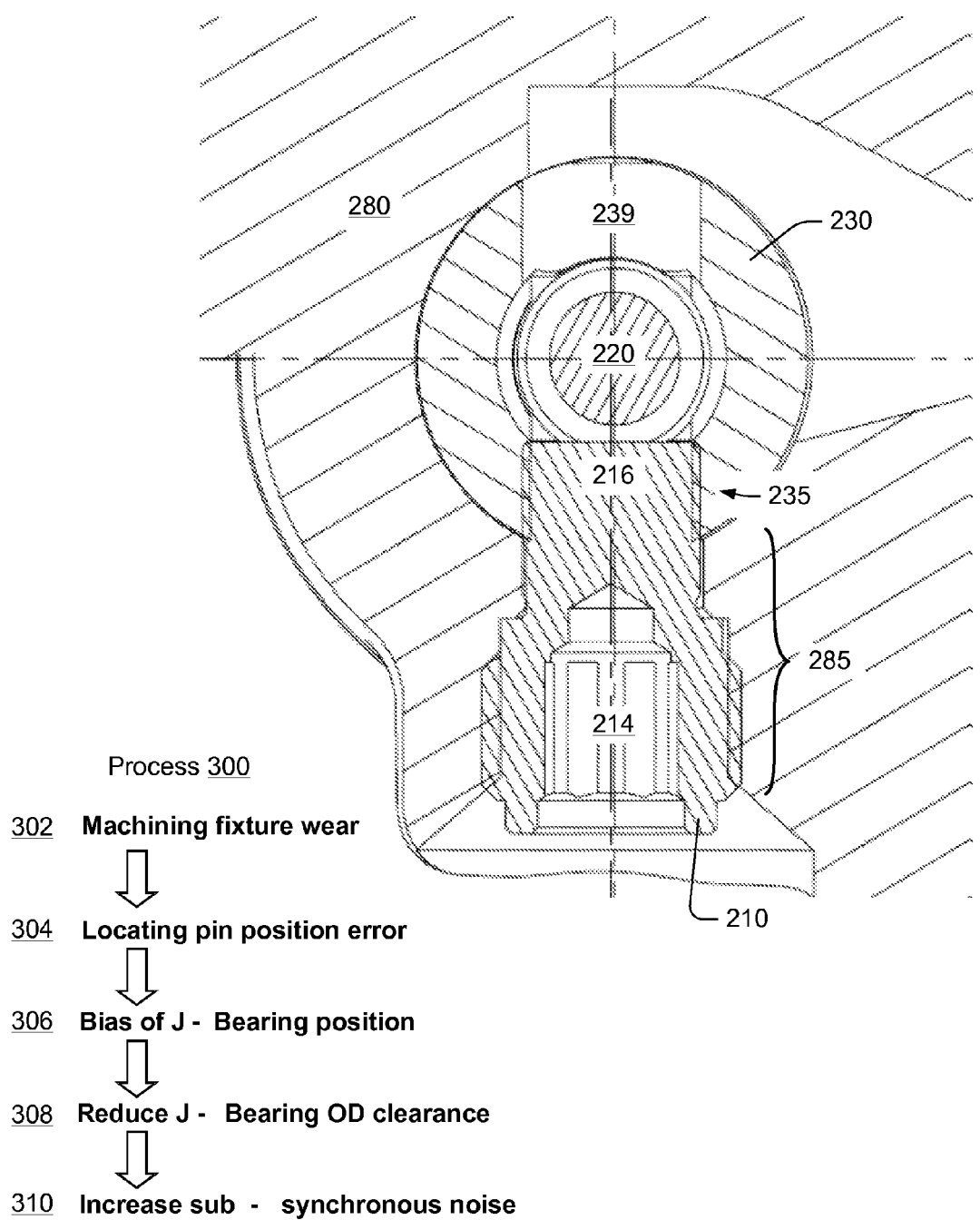
FIG. 3 is a cross-sectional view of the turbocharger assembly of FIG. 2.

FIG. 3 shows a cross-sectional view of a portion of the turbocharger assembly 200 of FIG. 2 and an example of a process 300. The process 300 includes machining fixture wear 302, locating pin position error due to wear 304, biasing of a journal bearing due to position error 306, reduction of journal bearing outer diameter clearance with respect to an inner diameter of a bore due to biasing 308 and increasing sub-synchronous noise 310, for example, due to reduction in clearance. As mentioned, various types of wear can occur for a semi-floating journal bearing that is located in a bore of a housing by a locating pin such as the locating pin 210 of the example of FIG. 3. For example, wear between a locating pin and a journal bearing can occur due to high axial load, vibration, poor design, material and heat treatment or any combination of such factors.

As described herein, a particular type of a failure mode can arise from mislocation of a locating pin during assembly, which may, for example, lead to noise. In the examples of FIGS. 2 and 3, the locating pin 210 includes a portion 214 for securing the locating pin 210 in the socket 285 of the housing 280 and a portion 216 for receipt by the aperture 235 of the bearing 230. The socket 285 may be formed by machining the housing 280, which can introduce some error. For example, error may exist where the axis of the socket 285 does not align orthogonally with an axis of the bore 282 of the housing 280. In such an example, when the locating pin 210 is inserted into the socket 285, the error may cause the journal bearing 230 to be offset slightly from the axis of the bore 282 of the housing 280. Such an offset may alter clearances between outer surfaces of the journal bearing 230 and bore walls that define the bore 282 of the housing 280. During operation, lubricant films formed in such clearances may be uneven, which may diminish damping ability of the lubricant films. With reduced damping capabilities, the assembly 200 may experience more vibration and, hence, more noise. Accordingly, imperfections in locating pin alignment (e.g., within supplier capabilities) can give rise to generation of sub-synchronous vibrations.

While FIGS. 2 and 3 illustrate a threaded socket and locating pin, another type of arrangement includes press fitting of a locating pin into a socket of a housing. When press fitting a locating pin, the portion of the locating pin that interacts with a journal bearing is scarred (e.g., which can increase friction, wear, etc.).

Further, whether threaded, press fit or other technique is used to insert a locating pin, a risk can exist during installation that an aperture of the journal bearing and locating pin socket of the housing will not be aligned and that the locating pin will contact the journal bearing. As the locating pin may be installed using considerable force, any contact between the locating pin and the journal bearing may damage the locating pin, the journal bearing, generate debris, etc. As the force applied to a locating pin may be considerable, indication of inappropriate contact between the locating pin and a journal bearing may be difficult to sense and, if sensed, such sensing may be too late (e.g., after some damage has been inflicted to the locating pin, the bearing, the housing, etc.).

As described herein (e.g., with reference to FIGS. 2 and 3), use of a locating pin requires (i) machining a socket in a housing, (ii) providing a locating pin, and (iii) inserting the locating pin into the socket of the housing. Tolerances, errors, etc., in such materials or processes can lead to suboptimal performance. As described herein, another approach may be taken to locate a journal bearing in a bore of housing that does not include use of a locating pin.

Figure 4:
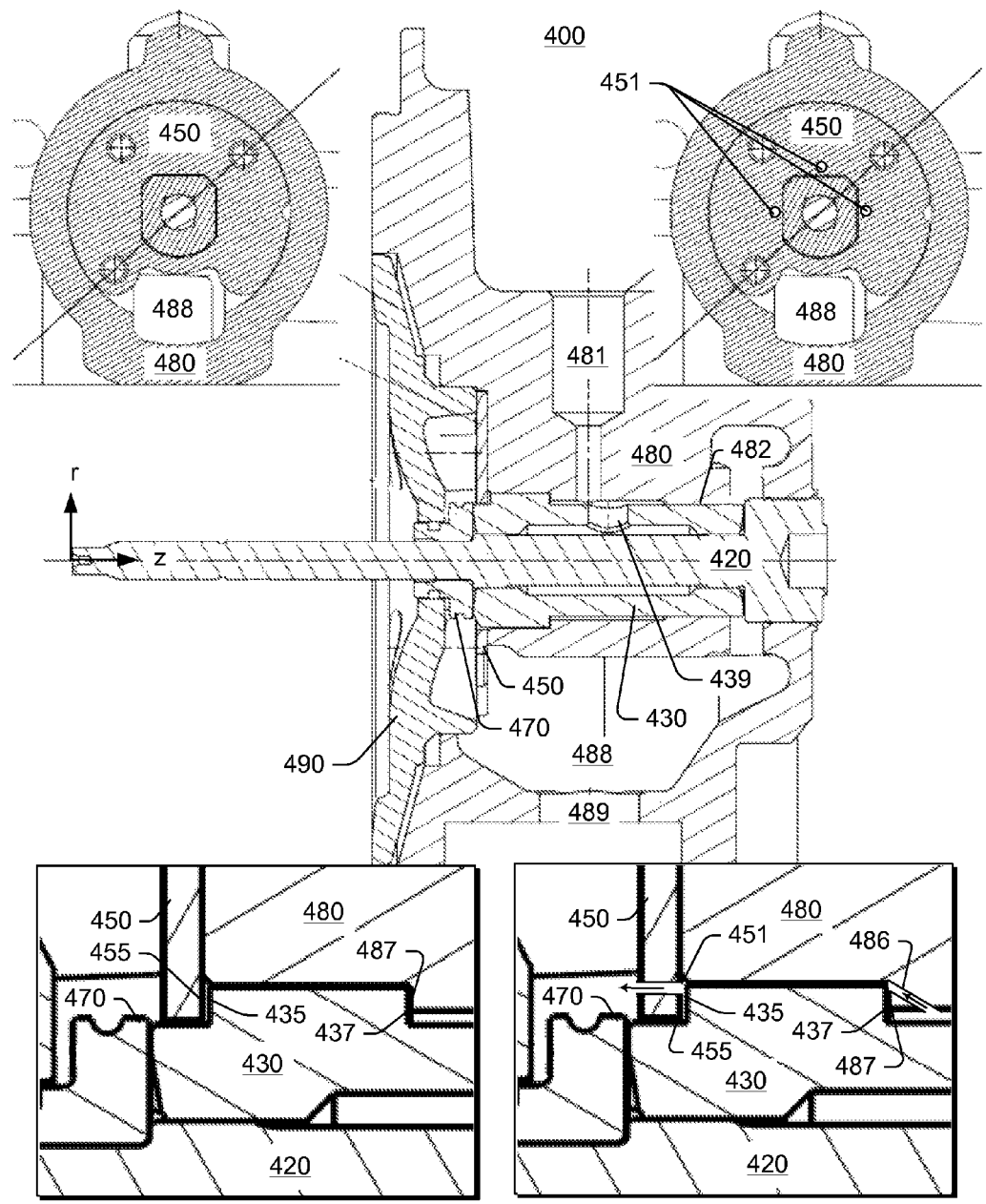
FIG. 4 is a series of cross-sectional views of an example of a turbocharger assembly.

FIG. 4 shows various cross-sectional views of an example of a turbocharger assembly 400. The turbocharger assembly 400 includes a shaft 420 supported by a journal bearing 430 disposed in a through bore 482 of a housing 480 as well as a locating plate 450 attached to a compressor side of the housing 480 and a thrust spacer 470 disposed in an opening of a compressor back plate 490. The shaft 420 includes a compressor end and a turbine end. A turbine wheel may be attached to the shaft 420 to form a shaft and wheel assembly (SWA). As shown, the housing 480 can include a lubricant inlet 481, a lubricant collection chamber 488 and a lubricant exit 489 that allows for lubricant to exit the lubricant collection chamber 488.

In the example of FIG. 4, the locating plate 450 is disposed between the housing 480 and the compressor back plate 490, both of which may be attached to the housing 480 (e.g., via one or more bolts, etc.). In the example of FIG. 4, the housing 480 includes an annular axial face 487 disposed between two diameters of the bore 482 of the housing. From the compressor side of the housing 480, the journal bearing bore portion of the bore 282 has a larger diameter that steps down to a smaller diameter; thus, forming the annular axial face 487. Such an arrangement of features may be referred to as a counterbore arrangement (e.g., as the bore 282 of the housing 480 includes two diameters).

In the example of FIG. 4, the journal bearing 430 includes an enlarged diameter portion at or near its compressor end disposed between two axial faces 435 and 437 (e.g., with corresponding annular shoulders). In the example of FIG. 4, the axial face 437 may be an annular axial face; whereas the axial face 435 may have another shape, for example, to cooperate with the locating plate 450.

As to axially locating the journal bearing 430 in the bore of the housing 480, toward the turbine side, the axial face 437 of the journal bearing 430 can abut the axial face 487 of the housing 480 and, toward the compressor side, the axial face 435 of the journal bearing 430 can abut the locating plate 450, for example, at an axial surface 455. Thus, the journal bearing 430 is constrained axially between the locating plate 450 and the axial face 487 of the housing 480 (e.g., where the axial face 487 corresponds to a counterbore).

As to azimuthally locating the journal bearing 430 in the bore of the housing 480, the locating plate 450 may include one or more features that cooperate with one or more features of the journal bearing 430. For example, the locating plate 450 may include a keyed opening with one or more flat portions that cooperate with a flat portion of the journal bearing 430 (e.g., the journal bearing 430 may include a keyed compressor end). In the example of FIG. 4, the locating plate 450 may allow for radial movement of the journal bearing 430 while limiting rotation of the journal bearing 430. For example, the journal bearing 430 may slide up and down along a radial line while having limited movement in axial and azimuthal directions (e.g., as defined by various clearances).

In the example of FIG. 4, the locating plate 450 may define with respect to the journal bearing 430 various clearances that allow for some movement of the journal bearing 430, particularly radial movement. In such an arrangement, the journal bearing 430 may be referred to as a semi-floating journal bearing. As mentioned, radial movement can allow a journal bearing to make use of a lubricant film or films, which may absorb or damp energy (e.g., vibrational energy). In the example of FIG. 4, lubricant films may form between the outer surfaces of the journal bearing 430 and the inner surfaces that define the bore of the housing 480.

In the example of FIG. 4, lubricant may enter the housing 480 via the lubricant inlet 481 (e.g., an inlet pathway via a bore, etc.) that connects to the through bore 482 in which the journal bearing 430 is received. The journal bearing 430 may include an opening 439 for receipt of lubricant for forming one or more inner lubricant films (e.g., disposed between inner journal surfaces of the journal bearing 430 and surfaces of the shaft 420). Lubricant entering the through bore 482 via the lubricant inlet 481 may also flow to clearances defined by the outer surfaces of the journal bearing 430 and the inner surfaces of the through bore 482 of the housing 480 to form outer lubricant films. As an example, one or more holes may be drilled or otherwise formed to feed lubricant directly to a clearance between a journal bearing and an inner surface of a bore for squeeze film formation. For example, a bore 486 may be formed in the housing 480 at the counterbore to provide for flow of lubricant between bore-bearing clearances. As an example, the housing 480 may include multiple bores at the counterbore (e.g., disposed at different azimuthal angles about a central axis of the through bore 482 of the housing 480). As an example, a bearing may include one or more passages that provide for passage of lubricant from a smaller diameter portion to a larger diameter portion of the bearing. For example, the bearing 430 may include a groove(s) and/or a notch(es) that extends from the axial face 487 to the outer surface of the enlarged diameter portion of the bearing 430 and/or a groove(s) and/or a notch(es) that extend from the axial face 435 to the outer surface of the enlarged diameter portion of the bearing 430. As an example, the locating plate 450 may include one or more passages 451 therethrough, for example, for passage of lubricant to a thrust spacer space. Such aforementioned features may assist with circulation of lubricant at or near a compressor side of a center housing rotational assembly (CHRA) of a turbocharger. For example, where a housing includes a counterbore (e.g., an enlarged bore and a smaller bore), flow of lubricant between each side of the counterbore may be enhanced by such features (e.g., which may be machined or otherwise formed into the housing, the bearing, the locating plate, etc.).

In the example of FIG. 4, lubricant may flow in a clearance between the axial face 437 of the journal bearing 430 and the axial face 487 of the housing 480 to reach the outer surface of the large diameter portion of the journal bearing 430. Thus, a lubricant film may form between the larger diameter portion of the journal bearing 430 and the larger diameter portion at the compressor side of the through bore of the housing 480. In the example of FIG. 4, lubricant may flow to the axial face 435 of the journal bearing 430 and form a film between the journal bearing 430 and the locating plate 450. As to thrust pads, the surfaces 435 and 437 of the journal bearing 430 may be considered thrust pads. Such surfaces may include one or more features that allow for flow, collection, etc., of lubricant to help absorb axial thrust forces such that detrimental contact between the journal bearing 430 and the housing 480 (e.g., surfaces 437 and 487) and between the journal bearing and the locating plate 450 (e.g., surfaces 435 and 455) is minimized (e.g., components separated by a thin lubricant film layer).

In the example of FIG. 4, the locating plate 450 may also provide for proper azimuthal locating of the journal bearing 430, for example, to ensure that the lubricant opening 439 of the journal bearing 430 is properly aligned with the lubricant inlet pathway 489 of the housing 480. As shown in FIG. 4, the locating plate 450 orients the journal bearing 430 such that the opening 439 in the journal bearing 430 is aligned with the lubricant inlet 481 (e.g., a passage in fluid communication therewith) to the through bore 482 of the housing 480. As an example, the size of the opening 439 may be selected to balance flow of lubricant to or within clearances between the journal bearing 430 and one or more other components of the assembly 400. For example, a smaller diameter opening may result in more flow to clearances defined at least in part by the outer surfaces of the journal bearing 430.

Figure 5:
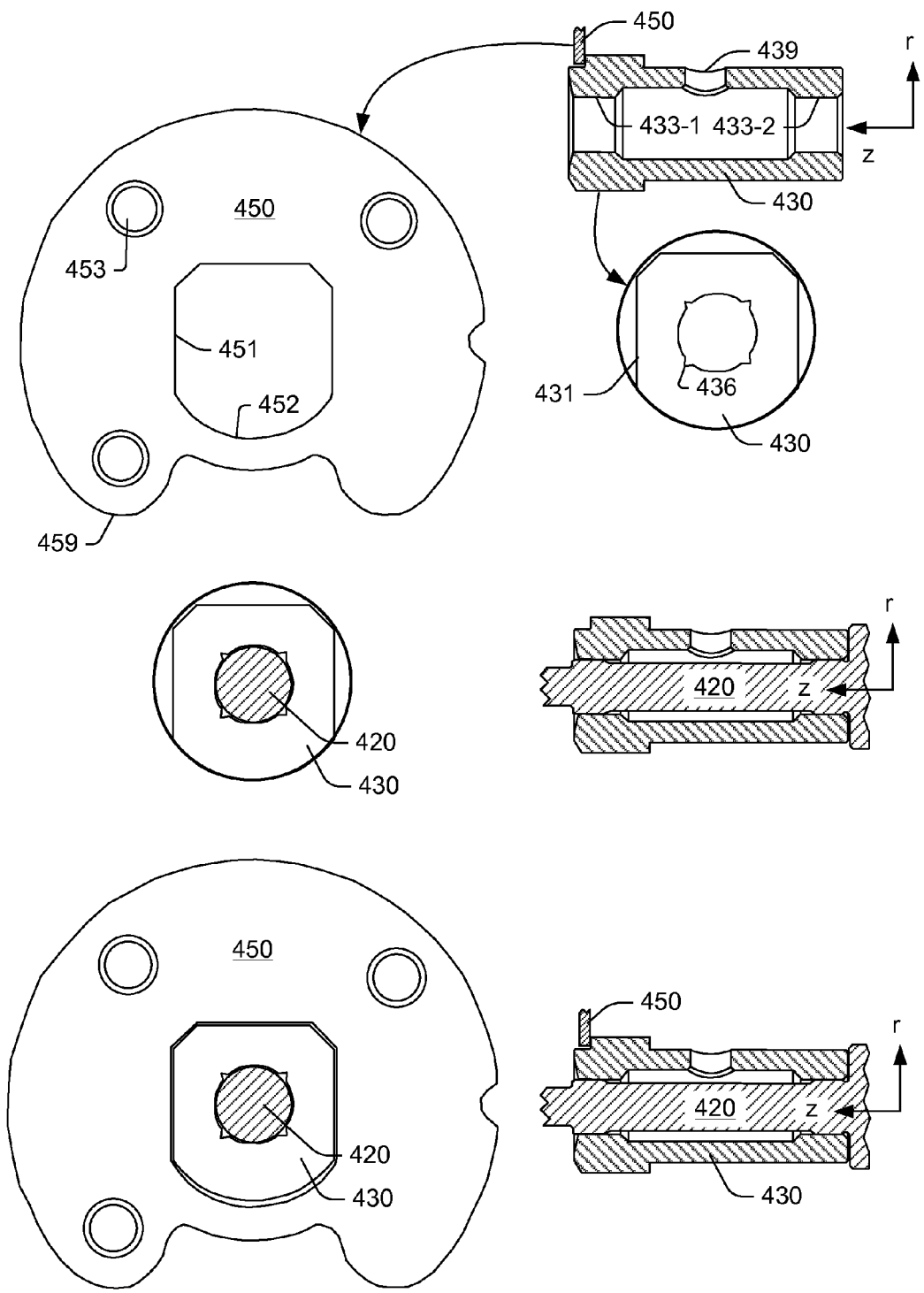
FIG. 5 is a series of views of a locating plate, a journal bearing and a shaft.

FIG. 5 shows various views of the shaft 420, the journal bearing 430 and the locating plate 450. As mentioned, the journal bearing 430 may include one or more flat portions 431 and the locating plate 450 may include one or more corresponding flat portions 451. Such portions may act to azimuthally locate a journal bearing within a bore, for example, while allowing for movement of the journal bearing along a radial line (e.g., up and down, optionally in a direction aligned with respect to gravity). As shown in the example of FIG. 5, the journal bearing 430 includes a compressor side inner journal surface 433-1 and a turbine side inner journal surface 433-2. Such surfaces can cooperate with one or more shaft surfaces to rotatably support a shaft where lubricant may form films in clearances between pairs of such surfaces. Also shown in the example of FIG. 5 are axial grooves or channels 436 that run along the inner journal surfaces 433-1 and 433-2 of the journal bearing 430. Such features can help promote lubricant film formation at the inner journal surfaces 433-1 and 433-2 and provide for replenishing flow of lubricant (e.g., for cooling, etc.).

In the example of FIG. 5, the locating plate 450 includes one or more openings 453 for receipt of bolts or other items to attach the locating plate 450 to a housing. The arrangement of openings may help to ensure that the locating plate 450 is properly oriented with respect to one or more features of a housing. The locating plate 450 also has an outer perimeter 459 that may be shaped to cooperate with one or more features of a housing. The outer perimeter 459 may be shaped to allow for drainage of lubricant, for example, by having a deviation along a lower portion such that the locating plate 450 does not hinder drainage of lubricant from a compressor side region defined by a compressor back plate and the locating plate 450 (see, e.g., the region defined by the compressor back plate 490 and the locating plate 450 in FIG. 4). Further, the locating plate 450 may include an opening with a lower perimeter 452 that allows for flow of lubricant from a lubricant film in a clearance between the journal bearing 430 and a bore of a housing. In such an example, when the lower perimeter 452 of the locating plate 450 is located downward with respect to gravity, lubricant may drain from a bore of a housing under influence of gravity as well as under influence of pressure (e.g., as provided by a lubricant pump or "oil pump").

As an example, a turbocharger assembly can include: a housing that includes a through bore extending from a compressor side to a turbine side of the housing and an axial face disposed in the through bore between a through bore surface at a first diameter and a through bore surface at a second diameter; a locating plate attached to the compressor side of the housing where the locating plate includes a keyed opening; and a journal bearing disposed in the through bore of the housing where the journal bearing includes a keyed compressor end and an enlarged outer portion defined between two axial faces by an outer diameter and an axial length where an axial length between the keyed compressor end and a turbine end of the journal bearing exceeds the axial length of the enlarged outer portion, where the axial face disposed in the through bore of the housing, the locating plate, and the two axial faces of the journal bearing axially locate the journal bearing in the through bore of the housing, and where the keyed opening of the locating plate and the keyed compressor end of the journal bearing azimuthally locate the journal bearing in the through bore of the housing.

Figure 6:
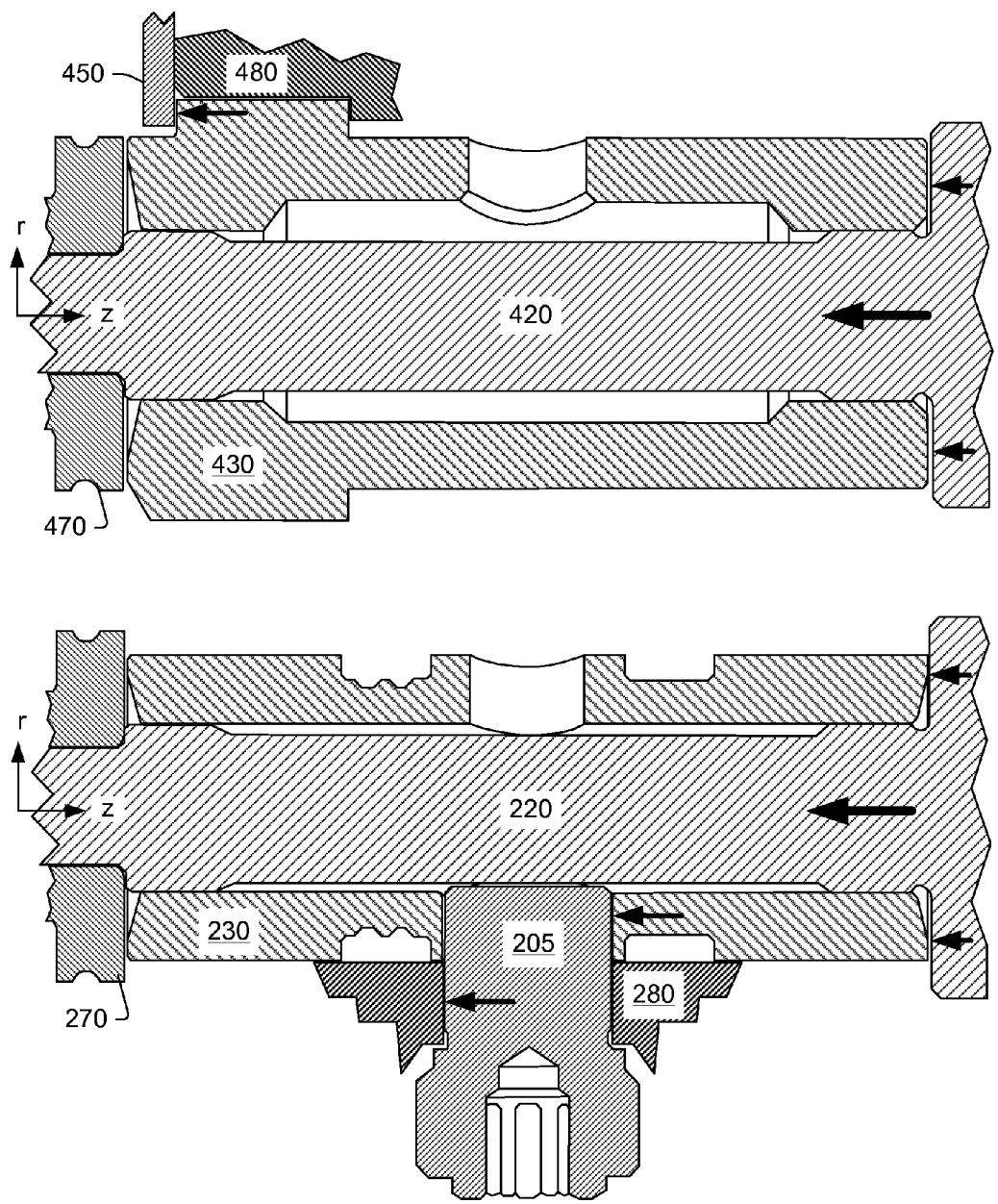
FIG. 6 is a series of cross-sectional views of a portion of the turbocharger assembly of FIGS. 2 and 3 and a portion of the turbocharger assembly of FIG. 4 with respect to axial thrust force directed from a turbine end to a compressor end.

As to axial thrust forces, FIG. 6 shows a scenario 600 with respect to a cross-sectional view of the arrangement of the assembly 400 and a cross-sectional view of the arrangement of the assembly 200 with approximate force vectors to indicate force for axial thrust in a direction from a turbine wheel toward a compressor wheel of a turbocharger. For the assembly 400, the locating plate 450 may act to absorb thrust force carried by the journal bearing 430 (e.g., via the axial face 435). In contrast, for the assembly 200, the locating pin 205 receives the axial thrust force carried by the journal bearing 230, which, in turn, impacts the housing 280. Further, a perimeter of the locating pin opening in the journal bearing 230 may wear, deform, etc., in response to such force. As mentioned with respect to the process 300 of FIG. 3, forces that wear, deform or otherwise allow for misalignment of components can be detrimental.

Figure 7:
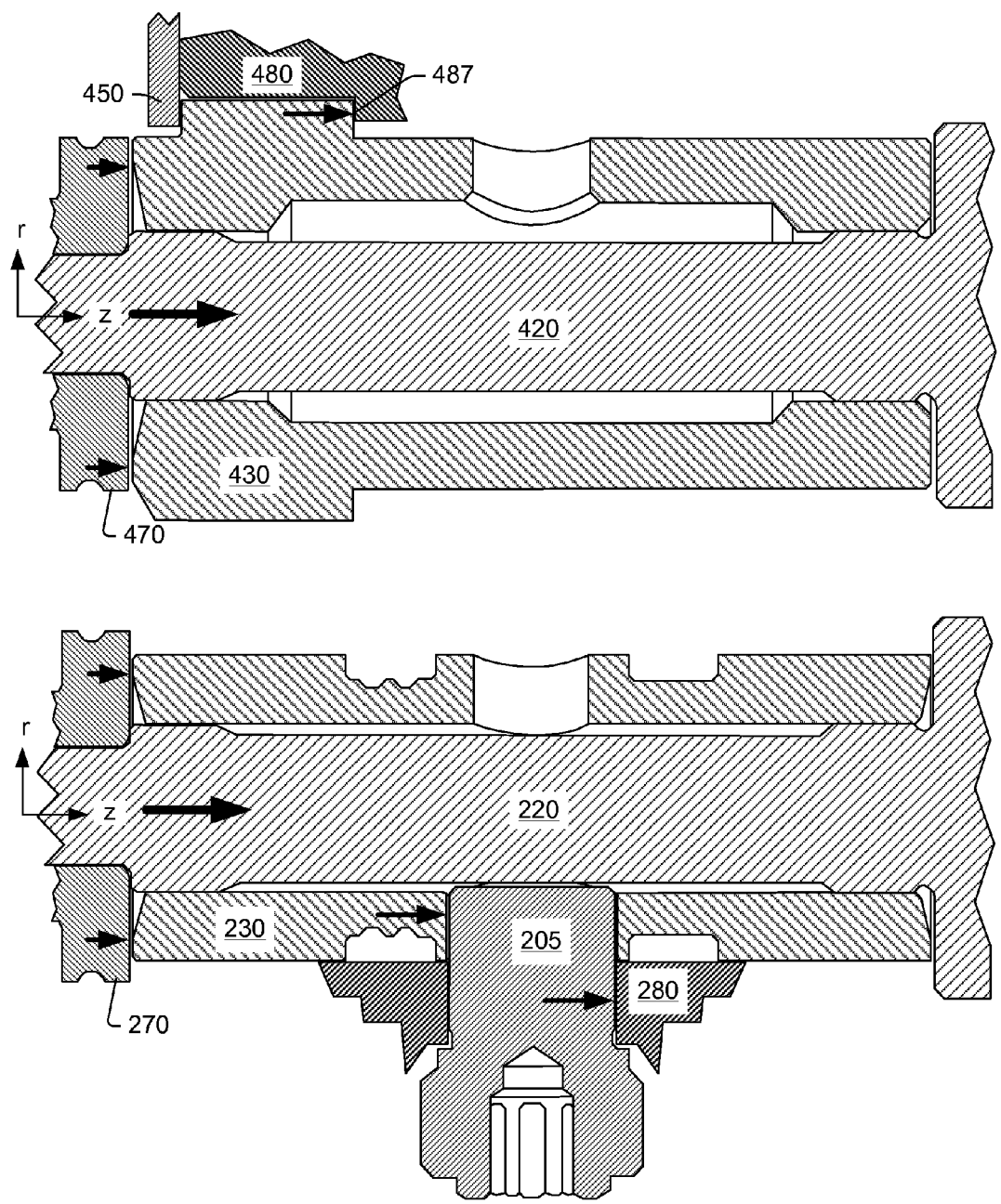
FIG. 7 is a series of cross-sectional views of a portion of the turbocharger assembly of FIGS. 2 and 3 and a portion of the turbocharger assembly of FIG. 4 with respect to axial thrust force directed from a compressor end to a turbine end.

As to axial thrust forces in a direction from a compressor wheel to a turbine wheel of a turbocharger, FIG. 7 shows a scenario 700 with respect to a cross-sectional view of the arrangement of the assembly 400 and a cross-sectional view of the arrangement of the assembly 200 with approximate force vectors. For the assembly 400, the axial face 487 of the housing 480 may act to absorb thrust force carried by the journal bearing 430 (e.g., via the axial face 437). In contrast, for the assembly 200, the locating pin 205 receives the axial thrust force carried by the journal bearing 230, which, in turn, impacts the housing 280. Further, a perimeter of the locating pin opening in the journal bearing 230 may wear, deform, etc., in response to such force. As mentioned with respect to the process 300 of FIG. 3, forces that wear, deform or otherwise allow for misalignment of components can be detrimental.

Figure 8:
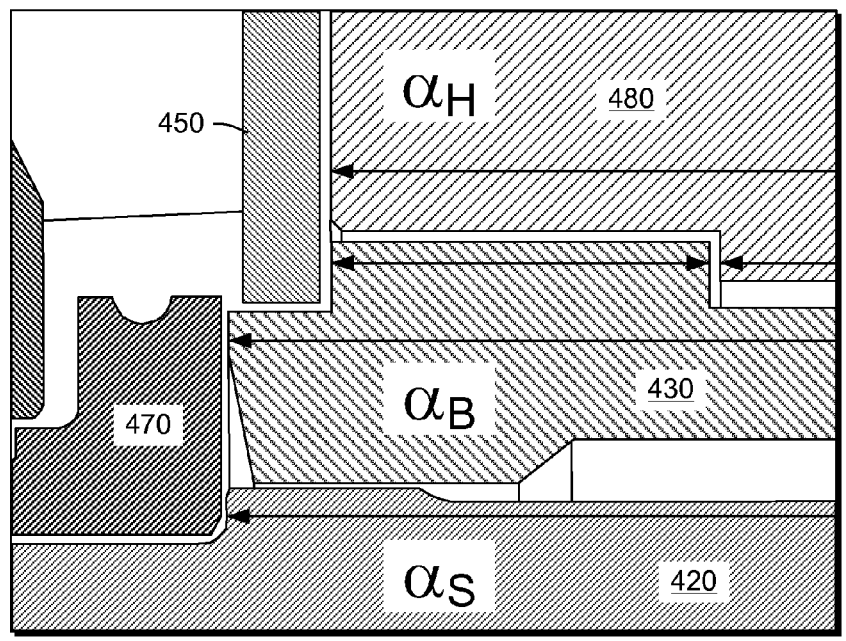
FIG. 8 is a series of cross-sectional views of an assembly.
Figure 8:
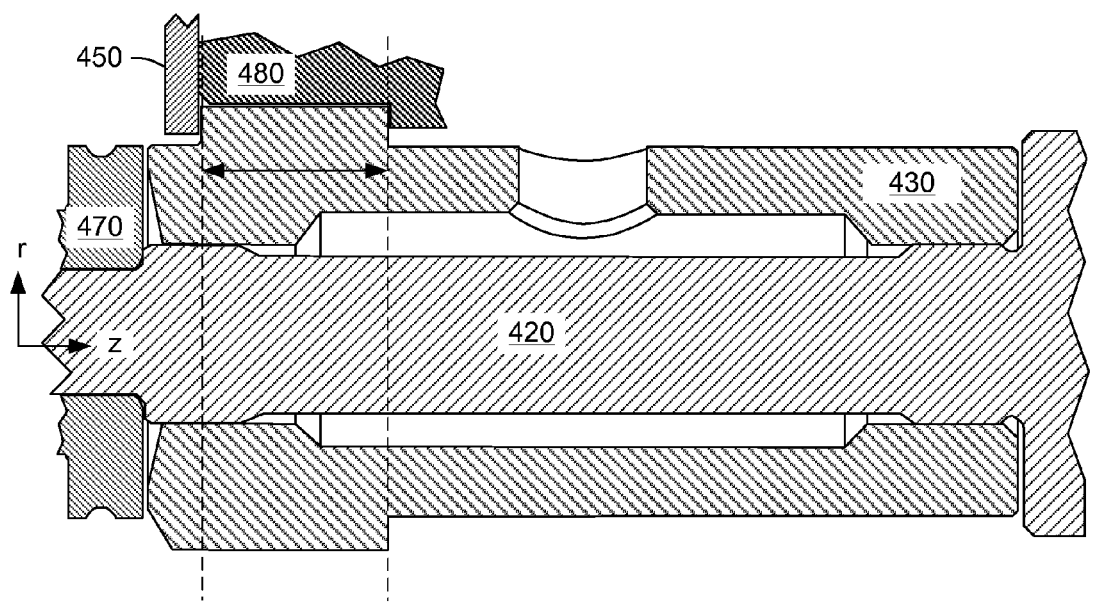

FIG. 8 shows cross-sectional views of a portion of the assembly 400, including the shaft 420, the journal bearing 430, the locating plate 450, the thrust spacer 470 and the housing 480. Each of these components may be made of a different material or a material treated in a different manner such that their linear coefficients of thermal expansion differ. For example, the housing 480 may be made of cast iron, the shaft made of stainless steel (e.g., 316), and the journal bearing 430 made of brass. As to some examples, linear coefficients of thermal expansion may differ considerably, for example, stainless steel (316) is about $16 \times 10^{-6}$ m/mK, brass is about $19 \times 10^{-6}$ m/mK, cast iron is about $12 \times 10^{-6}$ m/mK, aluminum is about $22 \times 10^{-6}$ m/mK and titanium is about $9 \times 10^{-6}$ m/mK. Accordingly, heating or cooling of components in an assembly can alter one or more clearances. Where such clearances define lubricant film regions for lubricant films, changes in temperature may have some impact lubricant film performance.

In the example of FIG. 8, axial clearances for the journal bearing 430 may be defined by selection of the axial position of the locating plate 450 and the axial face 487 of the housing 480 as well as the axial length of the enlarged diameter portion of the journal bearing 430, which is defined between its axial faces 435 and 437. Further, as the axial length of the enlarged diameter portion of the journal bearing 430 decreases, the impact of temperature change becomes less in terms of overall magnitude.

As to shape of the opening of the locating plate 450, it may have a perimeter edge that is machined to avoid certain stress profiles when exposed to axial thrust forces. For example, edges may be rounded (e.g., axially) and transitions from a flat portion to another flat portion or other portion may be rounded as well.

Figure 9:
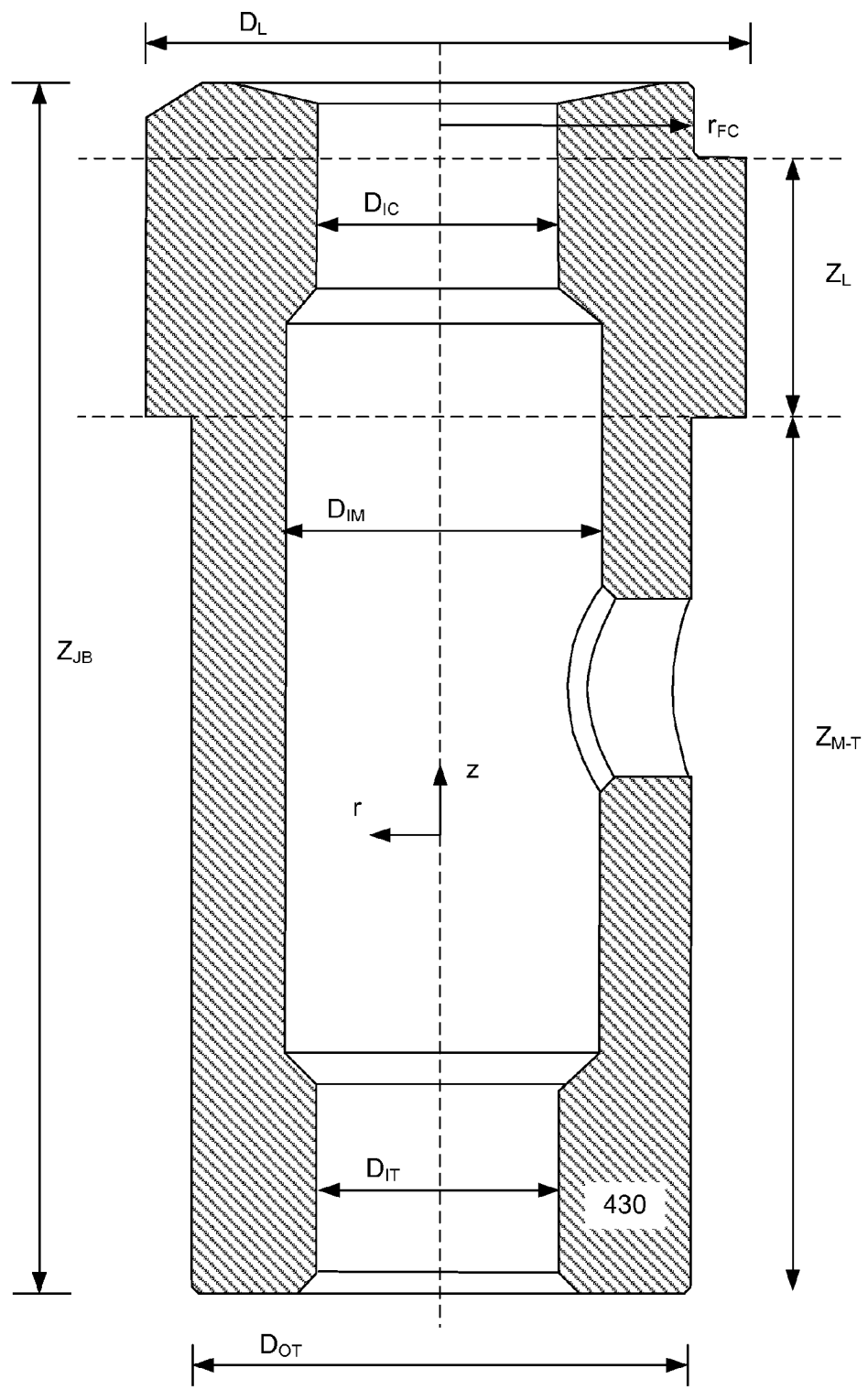
FIG. 9 is a cross-sectional view of an example of a journal bearing.

FIG. 9 shows a cross-sectional view of the journal bearing 430. In the example of FIG. 9, an axial distance $Z_L$ is shown with respect to an enlarged outer diameter $D_L$ portion of the journal bearing 430 that transitions to a relatively constant outer diameter $D_{OT}$ to the turbine end of the journal bearing 430. While the length of the journal bearing may be of the order of 3 cm, the axial distance for purposes of axial locating may be less (e.g., of the order of a centimeter or less, for example, less than about one third the total length of the journal bearing). Also shown in the example of FIG. 9 are an inner journal diameter $D_{JC}$ near the compressor end and an inner journal diameter $D_{JT}$ near the turbine end. The journal bearing 430 includes a larger inner diameter $D_{IM}$ over an axial length between the two inner journals. Also shown in FIG. 9 is a radius $r_{FC}$, which corresponds to a radius of a flat, for example, at its center (e.g., noting that a flat may be defined as having a range of radii such as those of a chord of a circle).

Figure 10:
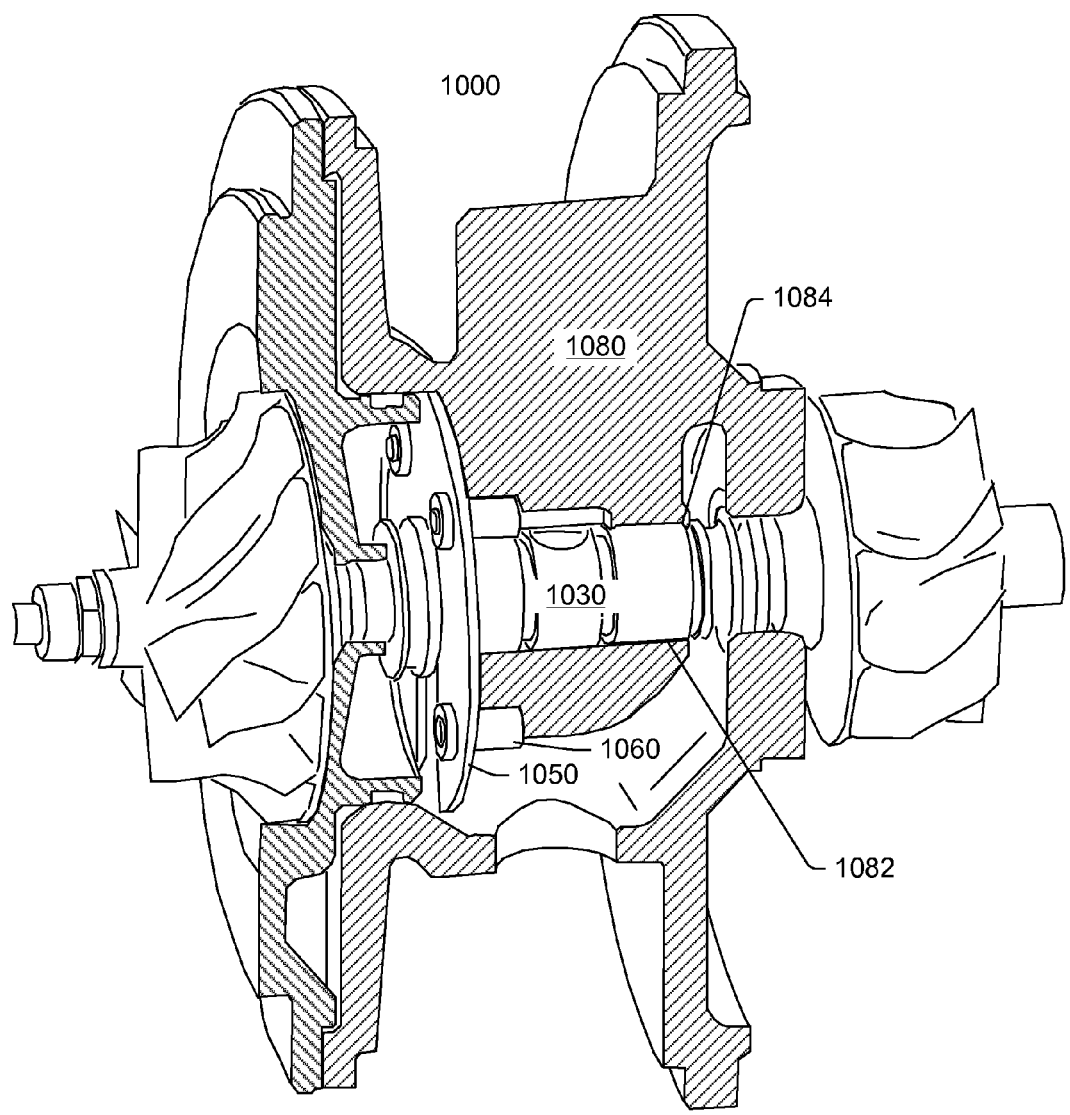
FIG. 10 is a cut-away view of an example of a turbocharger assembly.

FIG. 10 shows a perspective cut-away view of an example of a turbocharger assembly 1000 that includes a counterbore 1084 in a housing 1080 located near a turbine end of a bore 1082 to axially locate a journal bearing 1030 and a locating plate 1050 attached at a compressor end of the bore to axially locate the journal bearing 1030. For example, bolts

1060 may be received via apertures in the locating plate 1050 and received via bolt bores in the housing 1080 where, for example, the bolts 1060 and the bolt bores of the housing 1080 may include threads or other cooperative features.

Figure 11:
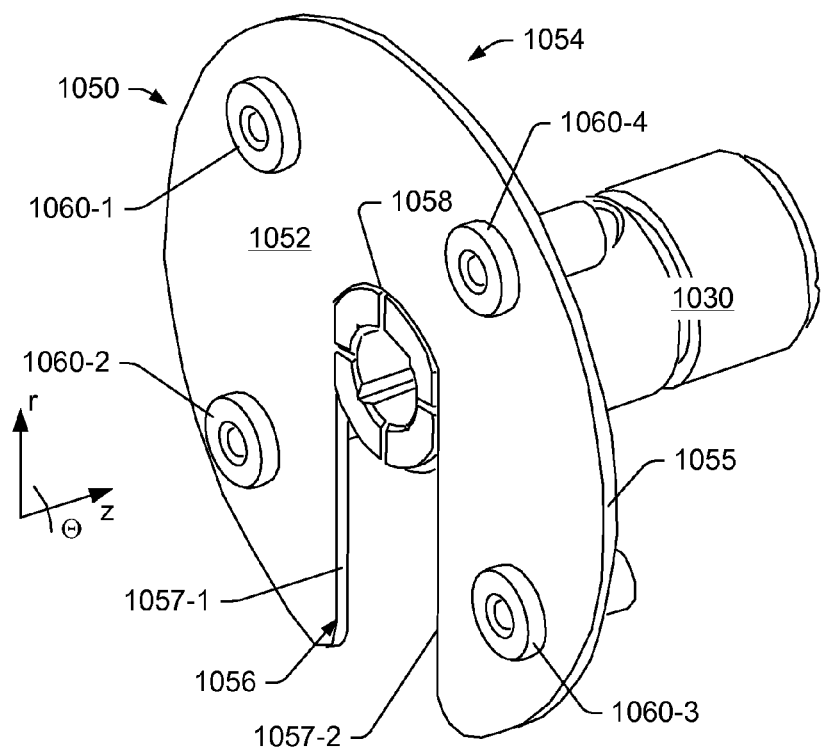
FIG. 11 is a series of views of an example of an assembly that includes a journal bearing and a locating plate for mounting to a housing.
Figure 11:
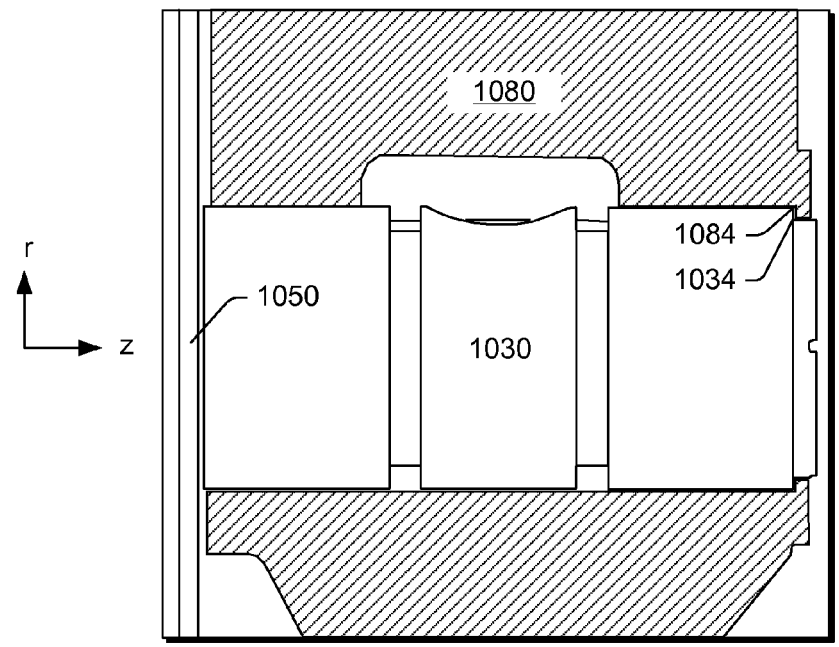

FIG. 11 shows a series of views of the example of the assembly 1000 that includes the journal bearing 1030 and the locating plate 1050 for mounting to the housing 1080, for example, via bolts 1060-1, 1060-2, 1060-3 and 1060-4. As shown in FIG. 11, the locating plate 1050 can include opposing faces 1052 and 1054 and a perimeter or edge 1055, which may be defined by a diameter, radius, etc., as well as a slot 1056 that is defined by a pair of straight edges 1057-1 and 1057-2 that lead to a curved upper edge 1058. In the cross-sectional view, the counterbore 1084 is shown with respect to a shoulder 1034 of the bearing 1030 to axially locate the bearing 1030 in the housing 1080 (e.g., to limit movement of the bearing 1030 toward a turbine side of the housing 1080). As to the locating plate 1050, the face 1054 abuts a compressor end of the journal bearing 1030, for example, along an annular shoulder of the journal bearing 1030 where a portion of the journal bearing 1030 extends axially into the slot 1056 of the locating plate 1050 such that various straight edges act to limit rotation of the journal bearing 1030 (e.g., azimuthal rotation) while allowing for at least some radial movement of the journal bearing 1030 (e.g., up and down in the slot 1056 of the locating plate 1050). As an example, the slot 1056 may include a curved, semi-circular upper edge 1058 and parallel straight edges 1057-1 and 1057-2 and the journal bearing 1030 may include a curved, semi-circular upper profile and straight side profiles. In such an example, where the slot 1056 is aligned with respect to gravity, the journal bearing 1030 may move along a radial line (e.g., up and down) aligned with respect to gravity (e.g., such that, when not in operation, a rotating assembly may settle and rest along a bore wall (or walls) of a housing.

Figure 12:
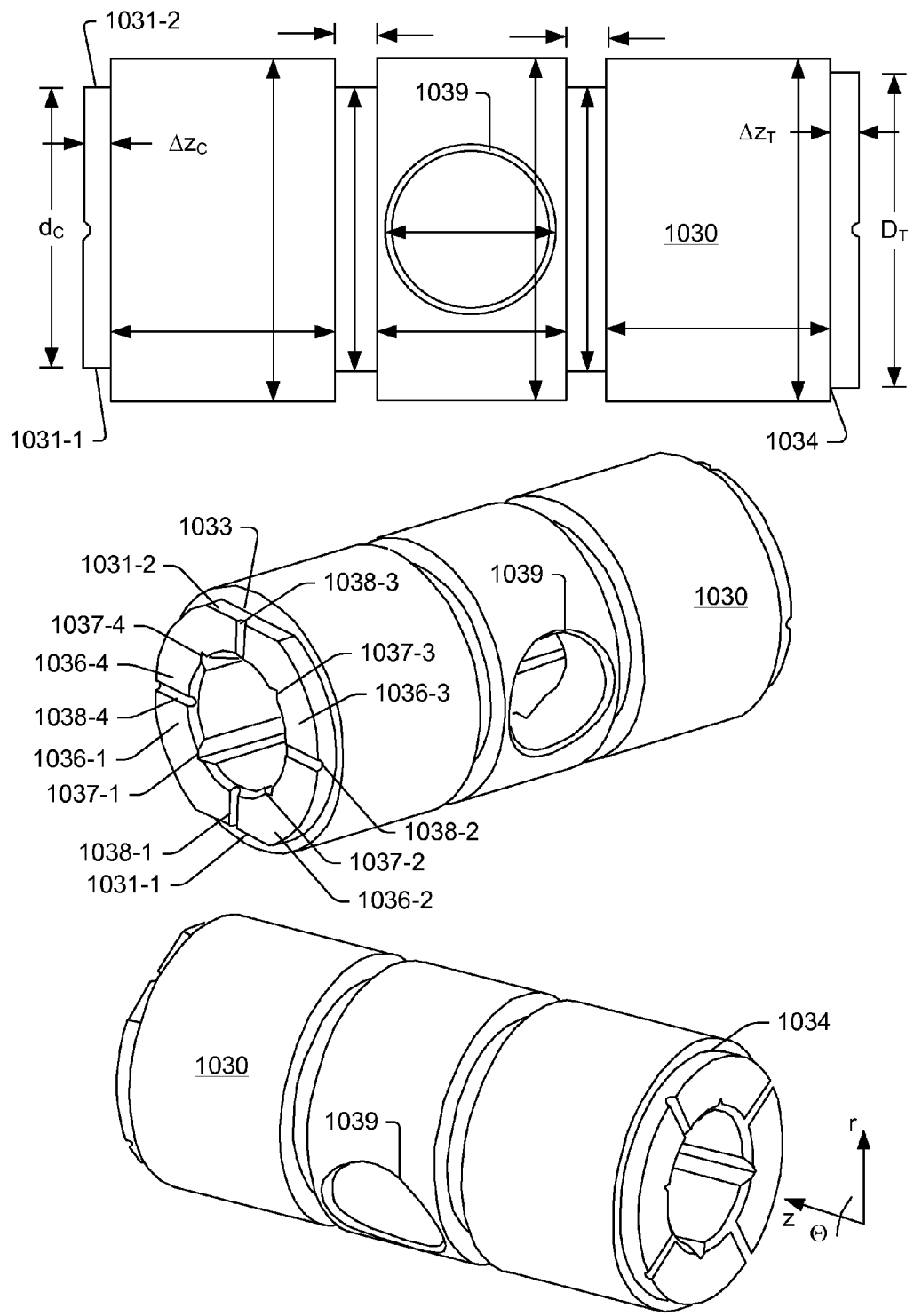
FIG. 12 is a series of views of examples of features of a journal bearing.

FIG. 12 shows a series of views of examples of features of the journal bearing 1030. For example, the journal bearing 1030 is shown as including axial grooves 1037-1, 1037-2, 1037-3 and 1037-4 that have a radial depth and that extend axially over the length of the bearing 1030. The bearing 1030 is also shown as including one or more flat portions 1031 at a compressor end to cooperate with, for example, one or more flat portions of an opening of a locating plate (e.g., a keyed end and a keyed opening). Such features may provide for azimuthally locating the journal bearing 1030 in a bore of a housing (e.g., anti-rotation features to limit rotation of the journal bearing 1030). At another end, the journal bearing 1030 includes a circumference and no flat portions.

Further, in the examples of FIG. 12, either or both ends may include features such as thrust pad features. For example, in FIG. 12, the bearing 1030 is shown as including thrust pad surfaces 1036-1, 1036-2, 1036-3 and 1036-4 that are separated by channels 1038-1, 1038-2, 1038-3 and 1038-4. Such channels may be offset, for example, by a certain number of degrees (e.g., 90 degrees) from the axial grooves 1037-1, 1037-2, 1037-3 and 1037-4 that run along an inner journal surface or surfaces of the journal bearing 1030. Both ends of the bearing 1030 may include such thrust pads and channels; noting that with respect to the flats 1031-1 and 1031-2, each of the thrust pad surfaces 1036-1, 1036-2, 1036-3 and 1036-4 includes a portion of a respective one of the flats 1031-1 or 1031-2, for example, where the channel 1038-1 provides for flow of lubricant to and/or from the flat 1031-1 and where the channel 1038-3 provides for flow of lubricant to and/or from the flat 1031-2. Thus, a bearing may include flats where each flat may be provided with a respective fluid communication channel (e.g., that extends between the flat and a bore of the bearing).

As shown in the example of FIG. 12, the compressor end of the bearing 1030 includes a dimension $d_C$, which is a distance between the flats 1031-1 and 1031-2, while the turbine end of the bearing 1030 includes a diameter $D_T$, for example, which corresponds to a circumference defined by a series of thrust pads. Also shown in FIG. 12 are various axial dimensions, including $\Delta z_C$ and $\Delta z_T$, which correspond to axial lengths for the compressor side thrust pads 1036-1, 1036-2, 1036-3 and 1036-4 that extend from a shoulder 1033 and the portion of the turbine side of the bearing 1030 (e.g., which may include thrust pads) that may be received by a smaller diameter portion of a counterbore of a housing that extends from the shoulder 1034 of the bearing 1030 (see, e.g., the counterbore 1084 of the housing 1080 of FIGS. 10 and 11). In the example of FIG. 12, axial facing surfaces that form the respective shoulders 1033 and 1034 may be contact surfaces for contacting a surface of a locating plate and a surface of a counterbore, respectively.

In the example of FIG. 12, the bearing 1030 includes a compressor side portion, a turbine side portion, intermediate annular grooves and a center portion that includes the opening 1039. In such an example, the annular grooves may provide for flow of lubricant about the bearing 1030, for example, to facilitate lubricant film formation in clearances between the compressor side portion and a wall of a bore of a housing and between the turbine side portion and a wall of a bore of a housing.

As an example, a bearing may be symmetric with respect to its ends such that it can be inserted into a bore via either end (e.g., where both ends include flats). In such an example, a counterbore may axially locate the bearing at one end and a locating plate may axially locate the bearing at its other end as well as limit its rotation (e.g., via the flats). As an example, a counterbore of a housing may include flats, additionally or alternatively to flats provided by a locating plate (see, e.g., the edges 1057-1 and 1057-2 where a counterbore may optionally include straight edges).

Figure 13:
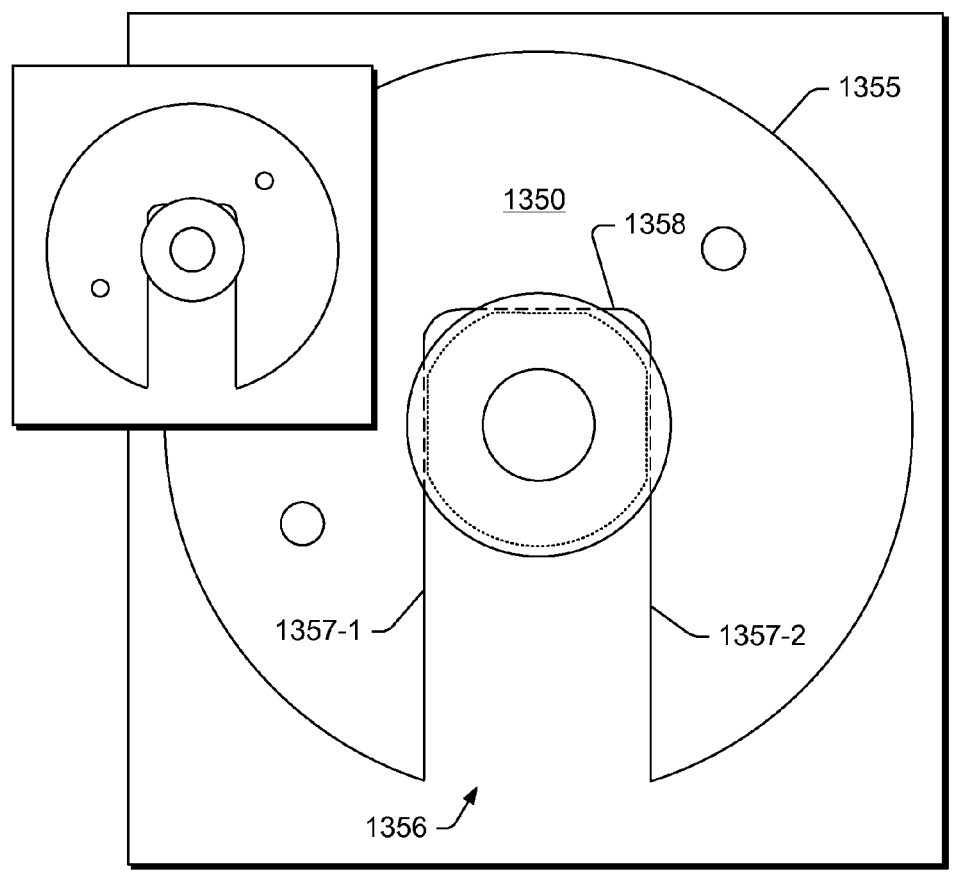
FIG. 13 is a series of views of an example of a journal bearing and a locating plate.
Figure 13:
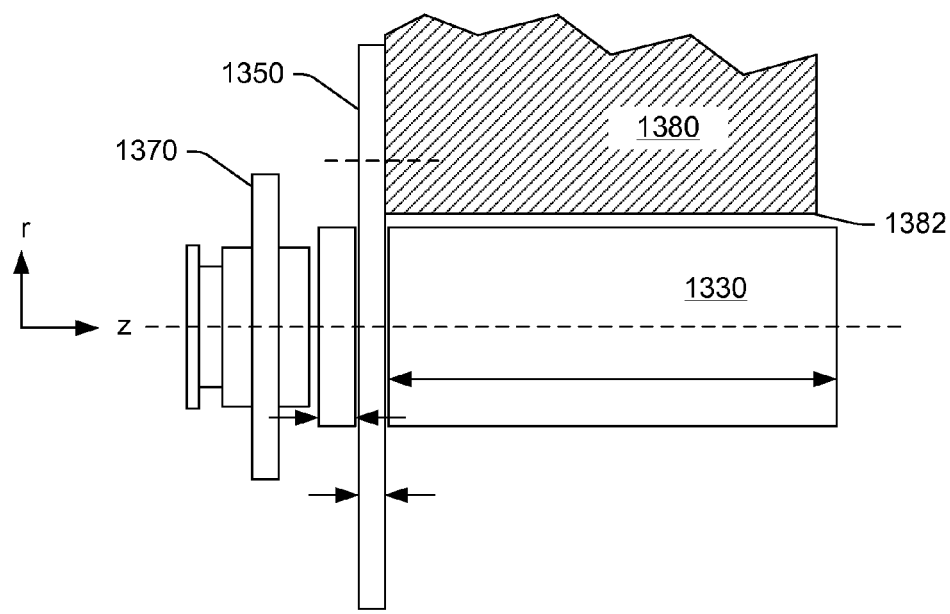

FIG. 13 shows a series of views of an example of a journal bearing 1330, a locating plate 1350 and a housing 1380 where the bearing 1330 is axially located by the locating plate 1350 with respect to a 1382 of the housing 1380. In the example of FIG. 13, the locating plate 1350 is received by an annular groove in the outer surface of the journal bearing 1330. As shown, a portion of the bearing 1330 extends axially toward a compressor side of an assembly past the locating plate 1350, for example, where it may abut a thrust spacer 1370. In such an example, the locating plate 1350 may axially and azimuthally locate the bearing 1330 with respect to the bore 1382 of the housing 1380.

As shown in the example of FIG. 13, the locating plate 1350 includes an outer edge 1355 that includes a slot 1356 with two inner edges 1357-1 and 1357-2 (e.g., straight edges) that join an upper or lateral edge 1358, which may be straight or curved, for example, to match a bearing to be used in an assembly. The slot 1356 may be or form a keyed opening (e.g., being keyed via one or more of its features). The locating plate 1350 may also include openings for receipt of studs, bolts, etc., for example, to attach the locating plate 1350 to a housing.

As an example, the bearing 1330 may include an annular groove with one or more flat portions or "flats" (e.g., one flat, two flats or three flats) that may come into contact with respective edges of the slot 1356 of the locating plate 1350. In such a manner, the locating plate 1350 may axially and azimuthally locate the bearing 1330 with respect to the housing 1380. For example, the locating plate 1350 can include a keyed opening that cooperates with a keyed annular groove of the journal bearing 1330 to axially and azimuthally locate the journal bearing 1330 with respect to a through bore 1382 of the housing 1380; optionally providing for radial movement of the journal bearing 1330 in the through bore 1382 of the housing. For example, the keyed opening of the locating plate 1350 in cooperation with the keyed annular groove of the journal bearing 1330 may allow for radial movement along a line that may be aligned with acceleration of gravity to thereby allow the journal bearing 1330 to settle in the through bore 1382 of the housing 1380 when not in operation and to lift during use (e.g., forming clearances between the journal bearing 1330 and walls of the through bore 1382 for lubricant film formation).

Figure 14:
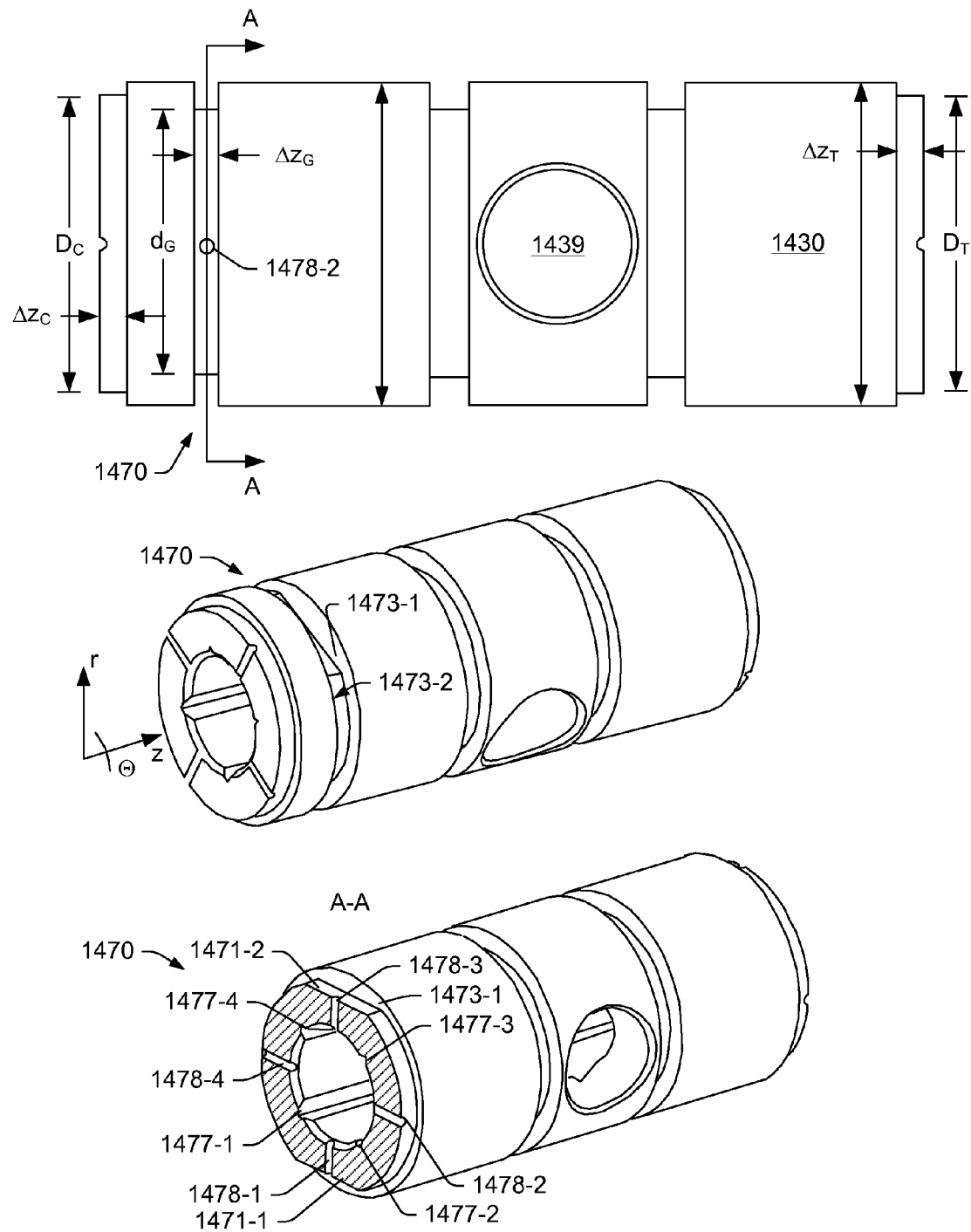
FIG. 14 is a series of views of an example of a journal bearing.

FIG. 14 shows various views of an example of a bearing 1430; noting that the bearing 1330 of FIG. 13 may include various features of the bearing 1430. In particular, FIG. 14 shows a top plan view, a perspective view and a perspective cut-away view where the bearing 1430 is cut in a plane along a line A-A.

As shown in the example of FIG. 14, the bearing 1430 includes an annular groove 1470 that is located near a compressor end of the bearing 1430. The groove 1470 includes an axial groove width $\Delta z_G$ and a groove dimension $d_G$, which may be defined as a distance between two flats 1471-1 and 1471-2, for example, that are disposed in the groove 1470 between axial facing surfaces 1473-1 and 1473-2 (e.g., which may be contact surfaces for contacting surfaces of a locating plate or other locating component). As an example, the journal bearing 1430 may include axial grooves 1477-1, 1477-2, 1477-3 and 1477-4 that have a radial depth and that extend axially over the length of the bearing 1430. While four axial grooves are shown, a bearing may include less than four axial grooves (e.g., including no axial grooves) or more axial grooves.

As to the annular groove 1470, the bearing 1430 is shown as including lubricant bores 1478-1, 1478-2, 1478-3 and 1478-4, for example, where the lubricant bore 1478-1 provides for flow of lubricant to and/or from the flat 1471-1 and where the lubricant bore 1478-3 provides for flow of lubricant to and/or from the flat 1471-2. Thus, a bearing may include a groove with flats where each flat may be provided with a respective fluid communication bore (e.g., that extends between the flat and a bore of the bearing). As an example, the lubricant bores may be offset, for example, by a certain number of degrees (e.g., 90 degrees) from axial grooves that run along an inner journal surface or surfaces of the journal bearing 1430.

As to other features of the bearing 1430, it may include various features of the bearing 1030, for example, as shown in FIG. 12 (see, e.g., the dimensions, thrust pads, etc.). As an example, the compressor end of the bearing 1430 may include thrust pad features that are the same or similar to those of the turbine end of the bearing 1430. For example, the compressor end may include a diameter $D_C$ defined by thrust pads having an axial length $\Delta z_C$ while the turbine end may include a diameter $D_T$ defined by thrust pads having an axial length $\Delta z_T$.

As an example, a bearing may be symmetric and include two annular grooves such as the annular groove 1470. In such an example, the bearing may be inserted into a housing via either end; noting that presence of an annular groove at the turbine end may not detract from performance of the bearing. As an example, a bearing may include an annular groove such as the annular groove 1470 and be used in an assembly that does not include a locating plate such as the locating plate 1350 of FIG. 13. For example, the bearing 1430 may be provided with symmetric end features and the annular groove 1470 and the bearing 1430 may be assembled into an assembly (e.g., a CHRA) with or without a plate that extends at least partially into the groove.

As an example, a turbocharger assembly can include a housing that includes a through bore extending from a compressor side to a turbine side of the housing; a locating plate attached to the compressor side of the housing where the locating plate includes a keyed opening; and a journal bearing disposed in the through bore of the housing where the journal bearing includes a keyed annular groove disposed intermediate a compressor end and a turbine end of the journal bearing where the keyed opening of the locating plate and the keyed annular groove of the journal bearing axially and azimuthally locate the journal bearing in the through bore of the housing. In such an example, the keyed annular groove can include at least one flat portion. For example, the locating plate can include at least one straight edge where the at least one straight edge azimuthally locates the journal bearing in the through bore of the housing via contact with the at least one flat portion of the annular groove of the journal bearing. As shown in FIG. 13, the locating plate 1350 can include at least one straight edge (e.g., the edge 1357-1, 1357-2 or 1358) that may contact a flat portion of a journal bearing. As an example, the journal bearing 1430 may include the annular groove 1470 with one or more flat portions. For example, the annular groove 1470 may include the flat portions 1471-1 and 1471-2 and optionally another flat portion. As an example, a single flat portion of an annular groove may be provided for contacting a flat portion (e.g., a straight edge) of an opening of a locating plate.

As an example, a keyed annular groove of a journal bearing may be located axially between an axial mid-point of the journal bearing and a compressor end of the journal bearing. As an example, where a journal bearing includes two keyed annular grooves, each may be located between a mid-point and a respective end of the bearing.

As an example, a journal bearing can include at least one lubricant bore that extends from a surface of a bore of the journal bearing to a surface of an annular groove (e.g., a keyed annular groove). For example, the surface of the annular groove to which the at least one lubricant bore extends may be a surface of a flat portion of the annular groove that forms a contact with a surface of a keyed opening of a locating plate. As mentioned, a keyed opening of a locating plate may allow for radial movement of a journal bearing in a through bore of a housing while limiting axial and azimuthal movements (e.g., axially locating and providing for anti-rotation of the journal bearing). As an example, axially locating may axially locate a journal bearing with respect to a housing within a relatively small margin of axial movement and azimuthal locating may azimuthally locate a journal bearing with respect to a housing within a relatively small margin of azimuthal movement (e.g., rotation). As to radial movement, such movement may be defined by clearances where, for example, the clearances allow for formation of lubricant films and some thickening and thinning of such films during operation; noting that after operation, lubricant pressure may diminish (e.g., as supplied by a lubricant pump driven by an internal combustion engine) and a rotating assembly of a turbocharger may settle under acceleration of gravity (e.g., to a bottom surface of a through bore of a housing).

As an example, a method can include providing a turbocharger assembly that includes a housing that with a through bore extending from a compressor side to a turbine side of the housing; a locating plate attached to the compressor side of the housing where the locating plate includes a keyed opening; and a journal bearing disposed in the through bore of the housing where the journal bearing includes a keyed annular groove disposed intermediate a compressor end and a turbine end of the journal bearing; operating the turbocharger assembly; and axially and azimuthally locating the journal bearing in the through bore of the housing via contacting the keyed annular groove of the journal bearing and the keyed opening of the locating plate (e.g., via flat portions, etc.). As an example, such a method may include providing lubricant to the housing and flowing a portion of the lubricant to the annular groove of the journal bearing via a lubricant passage from a surface of a bore of the journal bearing and a surface of the annular groove. In such a manner, contact between the locating plate and the journal bearing (e.g. at the annular groove) may be lubricated, for example, to diminish wear, friction, temperature, etc.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:
   a housing that comprises a through bore extending from a compressor side to a turbine side of the housing and an axial face disposed in the through bore between a through bore surface at a first diameter and a through bore surface at a second diameter;
   a locating plate attached to the compressor side of the housing wherein the locating plate comprises a keyed opening; and
   a journal bearing disposed in the through bore of the housing wherein the journal bearing comprises a keyed compressor end and an enlarged outer portion defined between two axial faces by an outer diameter and an axial length wherein an axial length between the keyed compressor end and a turbine end of the journal bearing exceeds the axial length of the enlarged outer portion,
   wherein the axial face disposed in the through bore of the housing, the locating plate, and the two axial faces of the journal bearing axially locate the journal bearing in the through bore of the housing, and
   wherein the keyed opening of the locating plate and the keyed compressor end of the journal bearing azimuthally locate the journal bearing in the through bore of the housing.

2. The turbocharger assembly of claim 1 wherein the keyed opening of the locating plate allows for radial movement of the journal bearing in the through bore of the housing.

3. The turbocharger assembly of claim 1 wherein the keyed opening of the locating plate and the keyed compressor end of the journal bearing azimuthally locate the journal bearing in the through bore of the housing with respect to a lubricant pathway of the housing.

4. The turbocharger assembly of claim 1 wherein the keyed opening of the locating plate comprises a perimeter having one or more flat portions.

5. The turbocharger assembly of claim 1 wherein the keyed compressor end of the journal bearing comprises a perimeter having one or more flat portions.

6. The turbocharger assembly of claim 1 wherein the axial face disposed in the through bore is formed by a counterbore.

7. The turbocharger assembly of claim 1 wherein the through bore comprises a lubricant opening at an axial location between the axial face and the turbine side of the housing.

8. The turbocharger assembly of claim 1 wherein the journal bearing comprises a smaller outer diameter that defines an outer surface that extends axially between the enlarged outer portion and the turbine end.

9. The turbocharger assembly of claim 1 wherein the axial length of the enlarged outer portion is less than approximately one-third the axial length between the keyed compressor end and the turbine end.

10. The turbocharger assembly of claim 1 wherein the journal bearing comprises at least one thrust pad at the keyed compressor end or at the turbine end.

11. A turbocharger assembly comprising:
    a housing that comprises a through bore extending from a compressor side to a turbine side of the housing;
    a locating plate attached to the compressor side of the housing wherein the locating plate comprises a keyed opening; and
    a journal bearing disposed in the through bore of the housing wherein the journal bearing comprises a keyed annular groove disposed intermediate a compressor end and a turbine end of the journal bearing wherein the keyed opening of the locating plate and the keyed annular groove of the journal bearing axially and azimuthally locate the journal bearing in the through bore of the housing and wherein the journal bearing comprises at least one lubricant bore that extends from a surface of a bore of the journal bearing to a surface of the keyed annular groove.

12. The turbocharger assembly of claim 11 wherein the journal bearing comprises compressor end thrust pads and turbine end thrust pads.

13. The turbocharger assembly of claim 11 wherein the keyed annular groove comprises at least one flat portion.

14. The turbocharger assembly of claim 13 wherein the locating plate comprises at least one straight edge wherein the at least one straight edge azimuthally locates the journal bearing in the through bore of the housing via contact with the at least one flat portion of the keyed annular groove of the journal bearing.

15. The turbocharger assembly of claim 11 wherein the keyed annular groove of the journal bearing is located axially between an axial mid-point of the journal bearing and the compressor end of the journal bearing.

16. The turbocharger assembly of claim 11 wherein the surface of the keyed annular groove to which the at least one lubricant bore extends comprises a surface of a flat portion of the keyed annular groove that forms a contact with a surface of the keyed opening of the locating plate.

17. The turbocharger assembly of claim 11 wherein the keyed opening of the locating plate allows for radial movement of the journal bearing in the through bore of the housing.

18. A method comprising:
    providing a turbocharger assembly that comprises
    a housing that comprises a through bore extending from a compressor side to a turbine side of the housing;
    a locating plate attached to the compressor side of the housing wherein the locating plate comprises a keyed opening; and a journal bearing disposed in the through bore of the housing wherein the journal bearing comprises a keyed annular groove disposed intermediate a compressor end and a turbine end of the journal bearing;

operating the turbocharger assembly;

axially and azimuthally locating the journal bearing in the through bore of the housing via contacting the keyed annular groove of the journal bearing and the keyed opening of the locating plate; and providing lubricant to the housing and flowing a portion of the lubricant to the keyed annular groove of the journal bearing via a lubricant passage between a surface of a bore of the journal bearing and a surface of the keyed annular groove.

\* \* \* \* \*